(12) United States Patent
Matsui et al.

(10) Patent No.: US 8,727,639 B2
(45) Date of Patent: May 20, 2014

(54) OPTICAL MODULE ASSEMBLED ON CIRCUIT BOARD VIA HOLDER

(75) Inventors: Takashi Matsui, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 175 days.

(21) Appl. No.: 13/547,900

(22) Filed: Jul. 12, 2012

(65) Prior Publication Data
US 2013/0022360 A1    Jan. 24, 2013

(30) Foreign Application Priority Data
Jul. 21, 2011 (JP) .................................. 2011-160208

(51) Int. Cl.
    *G02B 6/36* (2006.01)
(52) U.S. Cl.
    USPC ............................................ 385/88; 385/53

(58) Field of Classification Search
    USPC .......................................................... 385/88
    See application file for complete search history.

(56) References Cited

U.S. PATENT DOCUMENTS
2012/0183289 A1* 7/2012 Lou et al. .......................... 398/9

FOREIGN PATENT DOCUMENTS
JP         2008-028309 A      2/2008

* cited by examiner

*Primary Examiner* — Uyen Chau N Le
*Assistant Examiner* — Kajli Prince
(74) *Attorney, Agent, or Firm* — Venable LLP; Michael A. Sartori (57) ABSTRACT

An optical transceiver having an optical subassembly electrically connected to a circuit board with an RF connector is disclosed. The optical transceiver further provides a holder for support the RF connector. The circuit board is held by a leg and an arm each being provided in the holder, and putting the circuit board therebetween.

13 Claims, 10 Drawing Sheets

OPTICAL MODULE ASSEMBLED ON CIRCUIT BOARD VIA HOLDER

BACKGROUND OF THE INVENTION

1. Field of the Invention

The present invention relates to an optical subassembly, in particular, the invention relates to a mechanism to assemble the optical subassembly on a circuit board.

2. Background Arts

A Japanese Patent Application published as JP-2008-028309A has disclosed one type of an optical subassembly with an optical device and an optical coupling unit. The optical device may be a semiconductor laser diode (hereafter called as LD), and/or a photodiode (hereafter called as PD). The optical subassembly disclosed therein is electrically connected to a circuit board of the host system by lead pins extending from a housing of the optical subassembly, and physically fixed to the circuit board, or a case of the host system, by screws.

An optical module or an optical sub-assembly following the multi-source agreement of the XLMD-MSA provides a housing having screw holes to fix the module/sub-assembly to a case of, for instance, the CFP optical transceiver. A plurality of lead pins extends from the housing of the optical module/sub-assembly to be electrically connected with the circuit board.

In order to secure the signal quality in a high frequency region exceeding, for instance, 10 GHz, the optical module/sub-assembly may provide electrical connectors, or often called as RF connectors, specific to transmit such high frequency signals in addition to the lead pins. However, when the housing of the optical module/sub-assembly is not aligned with the circuit board, mechanical stresses may be arisen in the electrical connector by fixing the housing of the optical module/sub-assembly to the case or the circuit board of an optical transceiver, which may degrade the quality of the signal transmitting therethrough.

SUMMARY OF THE INVENTION

An aspect of the present invention relates to an optical transceiver that comprises an optical module or optical subassembly, a circuit board, and a holder. The optical module/subassembly may have a function of converting a signal between an electrical form and an optical form. The circuit board electrically couples with the circuit board via an RF connector and has a rectangular cut to set the optical module/subassembly therein. The holder has a leg and an arm to put the circuit board therebetween to support it. A feature of one of embodiments of the present invention is that the holder may support the RF connector thereon.

The optical module/subassembly of the embodiment may transmit/receive a high frequency signal via the RF connector, which may maintain the quality of the electrical signal even the frequency components thereof reaches, or often exceeds 10 GHz. Although the RF connector is larger in a size and heavier in a weight thereof, the holder may support not only the RF connector but the circuit board. Accordingly, the electrical connection between the circuit board and the optical module/subassembly may be reliable.

The optical module/subassembly on an embodiment of the invention may have a base with screw holes. However, the optical transceiver of the embodiment may install and fix the optical module/subassembly only via the holder. The base of the optical module/subassembly is not screwed with the circuit board nor the case of the optical transceiver.

The optical transceiver of an embodiment may further provide a latch to fix the optical module/subassembly to the circuit board. The latch may have a tab to push the optical module/subassembly against the circuit board in a thickness direction thereof. Moreover, the latch may have two legs to put the optical module/subassembly therebetween elastically, and an arm to be fixed to the circuit board. Thus, the latch may set the optical module/subassembly securely with respect to the circuit board.

BRIEF DESCRIPTION OF THE DRAWINGS

The invention will be described in further detail with reference to the attached drawings in which.

DESCRIPTION OF PREFERRED EMBODIMENTS

Next, some embodiments according to the present invention will be described as referring to drawings. In the description of the drawings, the numerals or symbols same or similar to each other will refer to the elements same or similar to each other without overlapped explanations.

Figure 1:
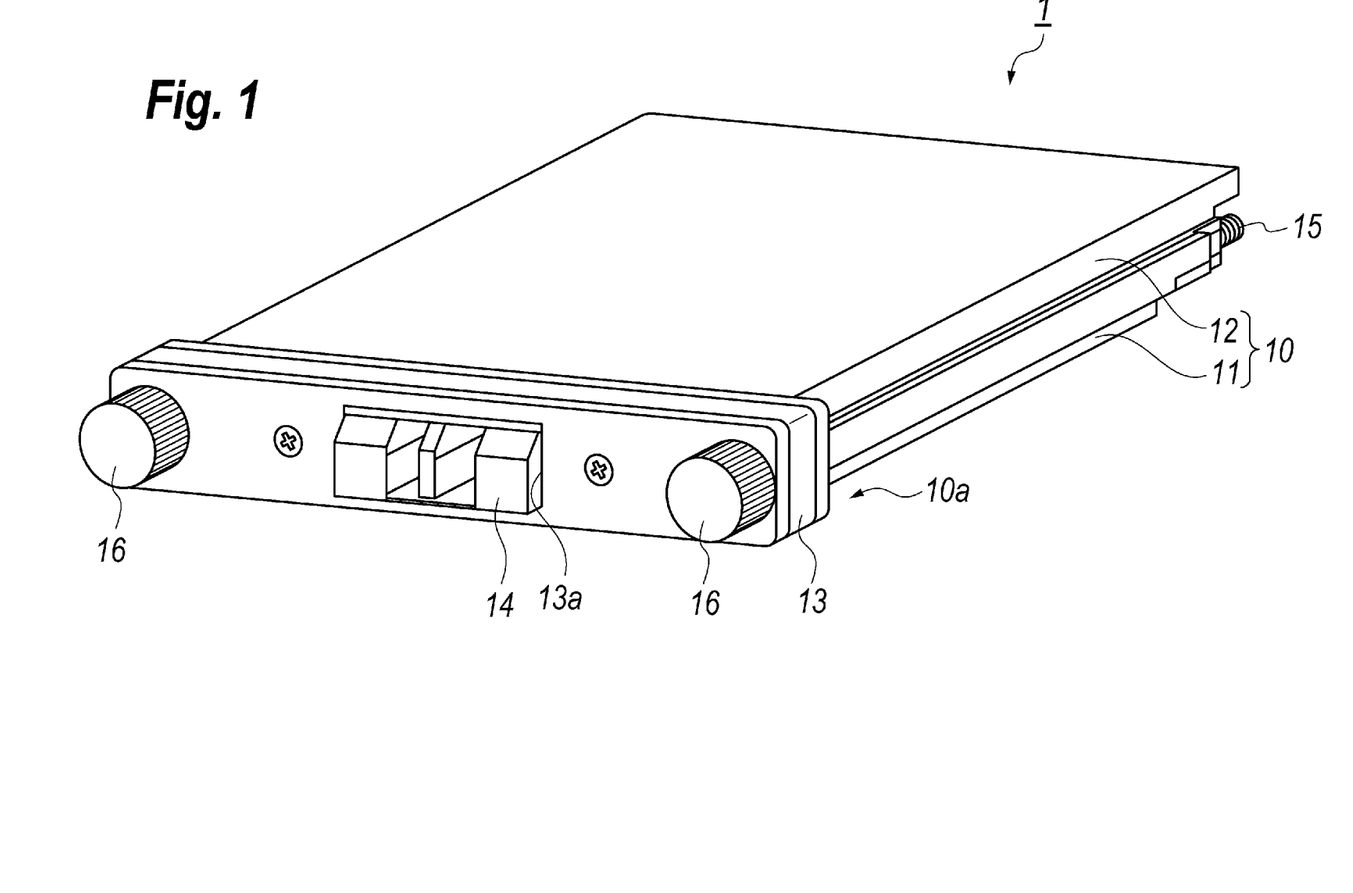
FIG. 1 is a front view of an optical transceiver according to an embodiment of the invention.
Figure 2:
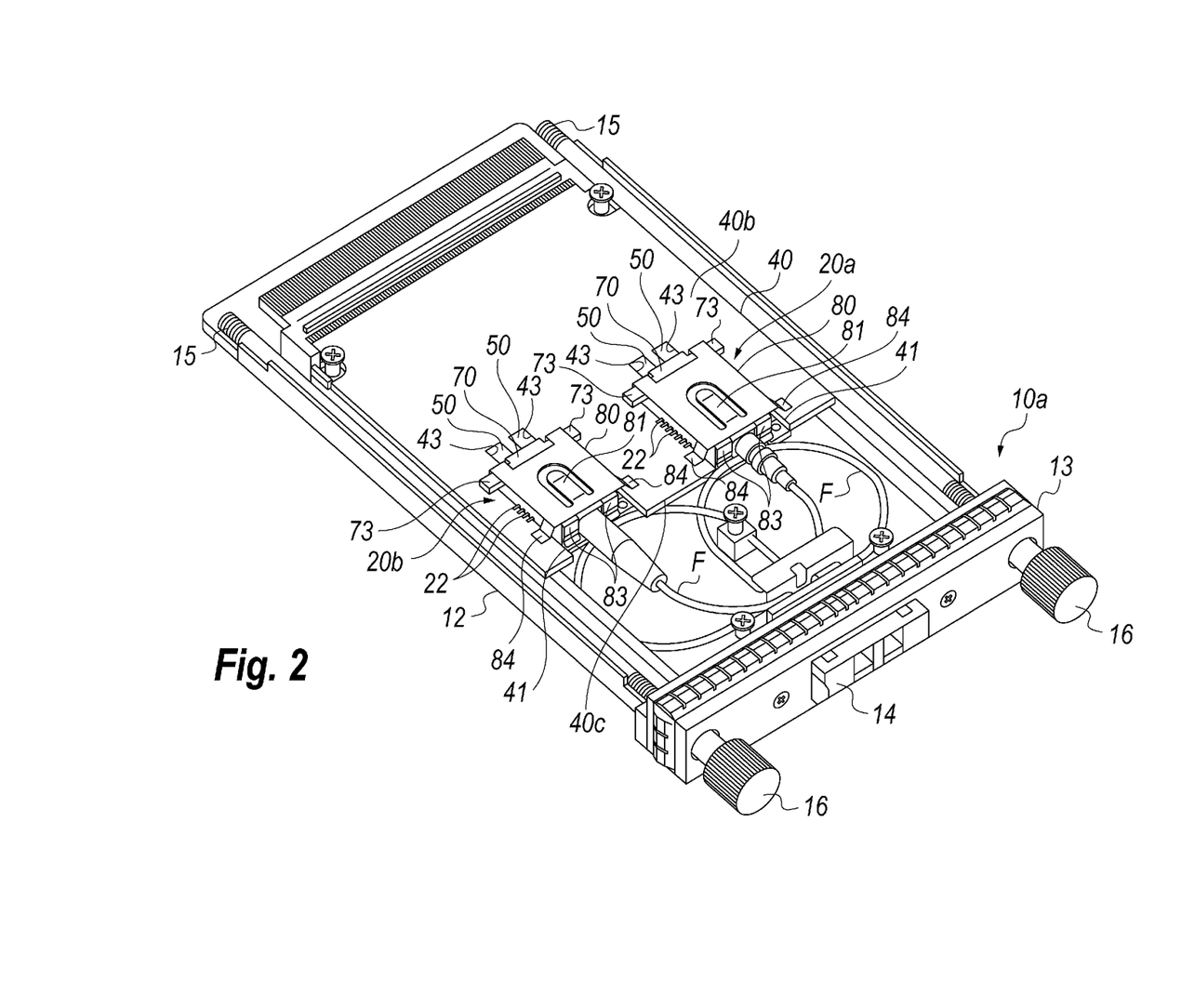
FIG. 2 views an inside of the optical transceiver shown in FIG. 1.
Figure 3:
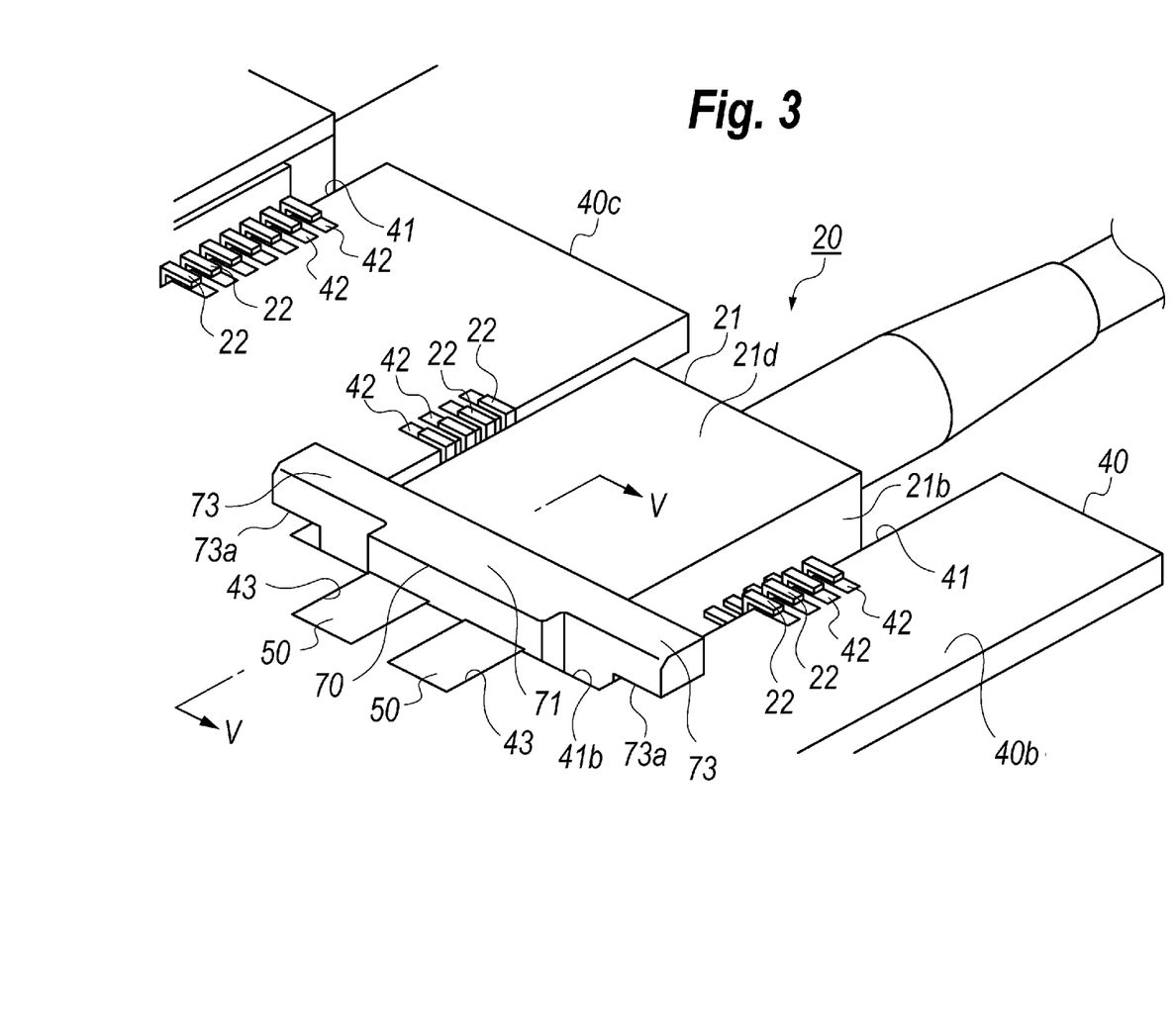
FIG. 3 magnifies an optical assembly installed in the optical transceiver shown in FIG. 1.
Figure 4:
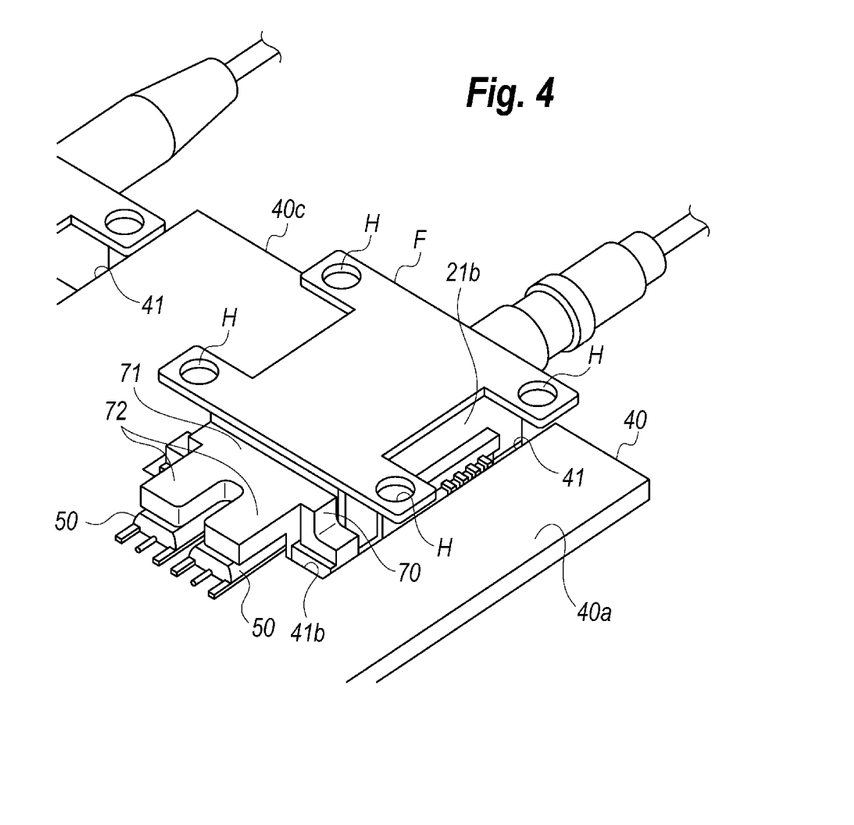
FIG. 4 also magnifies the optical assembly.
Figure 5:
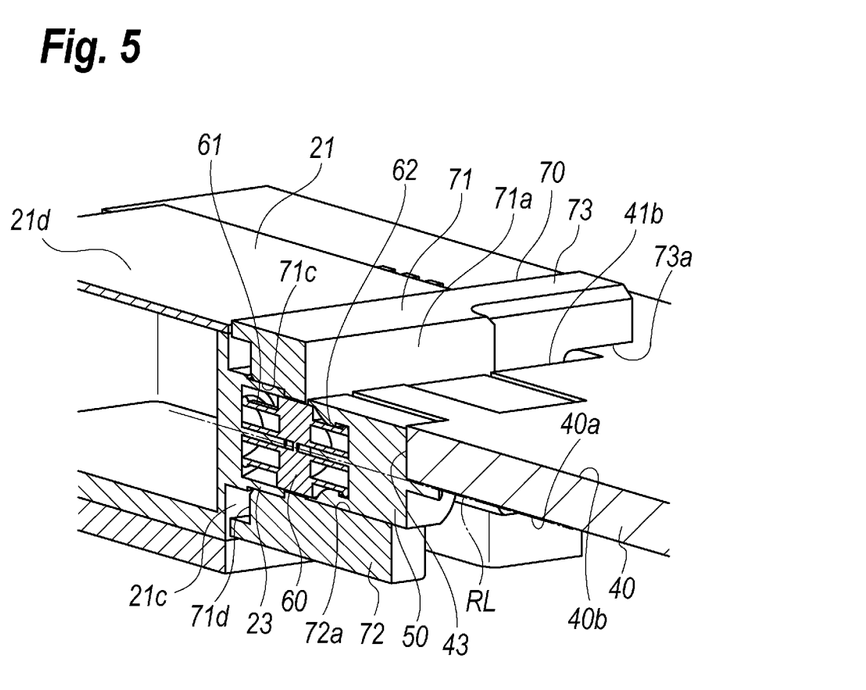
FIG. 5 is a partially cut view of the optical assembly taken along the line V-V appeared in FIG. 3.
Figure 6:
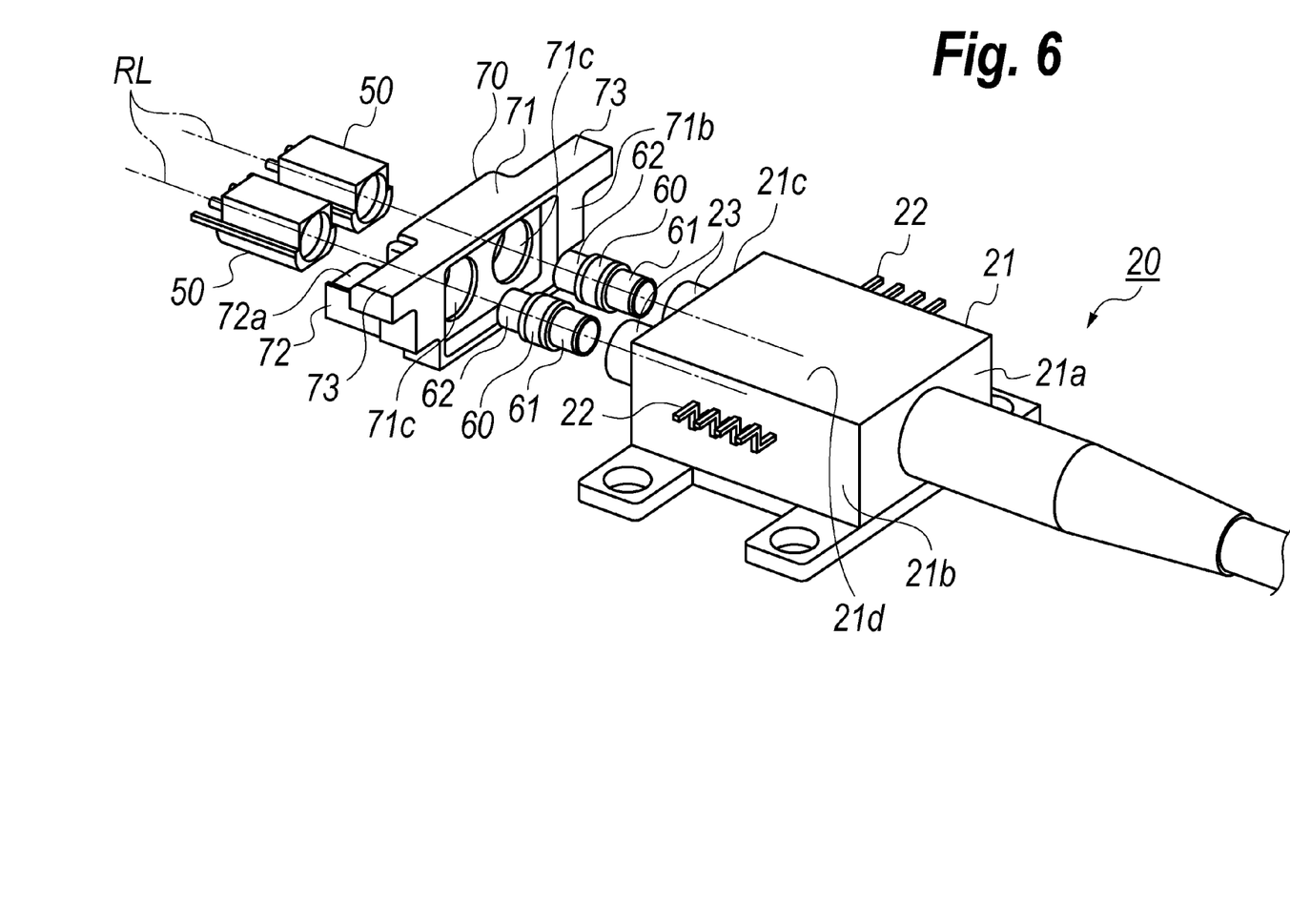
FIG. 6 is an exploded view of the optical assembly shown in FIG. 2.

FIG. 1 is a front view of an optical transceiver, while, FIG. 2 shows an inside thereof. FIGS. 3 and 4 magnify a portion where optical modules are assembled within the optical transceiver 1, FIG. 5 is a partially cut view taken along the ling V-V indicated in FIG. 3, and FIG. 6 is an exploded view of the optical module. The optical transceiver 1 according to an embodiment of the invention follows the standard of the multi-source agreement concerning to, what is called, CFP transceiver. The CFP transceiver 1 provides a housing 10 comprised of a bottom housing 11 and a top housing 12, where two parts of the housing, 11 and 12, forms a space into which optical components and electrical components described later in this specification are housed.

The housing 10 in a front 10a thereof assembles a front cover 13 with an opening 13a in a lateral center thereof. The opening 13a exposes an optical receptacle 14 with which an external optical connector, which is not shown in figures, is to be inserted. The front cover 13a in both sides thereof protrudes knobs 16 attached in a tip of a screw 15. The screw 15 protrudes from the rear of the optical transceiver 1 as passing the housing 10. The CFP transceiver 1 may be installed in the host system, which is not shown in the figures, by fastening the screw with the host system.

The CFP transceiver 1 includes two optical modules/subassemblies (hereafter denoted as OSA) 20, one of which 20a is for the optical transmission, while, the other 20b is provided for the optical reception. Then, the former optical subassembly 20a is often called as a transmitter optical subassembly (TOSA) that installs a semiconductor light generating device therein, typically a laser diode (LD); while, the latter 20b is called as a receiver optical subassembly (ROSA) that installs a semiconductor light receiving device, typically, a photodiode (PD).

The OSAs 20 provides a housing 21 with a rectangular or box shape with a front rear wall 21a, two side walls 21b, and a rear wall 21c, as shown in FIG. 6. Contexts, such as "front", "side", and "rear" are used only for the explanation sake, and they are not restricted to meanings of the contexts. The front wall 21a extrudes an inner fiber F therefrom. Two side walls 21b extrude a plurality of lead pins 22, part of which are electrically connected with semiconductor optical devices installed in the housing 10. The rear wall 21c extrudes a pair of housing connectors 23 with a cylindrical or co-axial shape. The housing connector 23 may be a male connector and carry high frequency signals therethrough without substantial degradation thereof.

The optical transceiver 1 may further provide in the housing 10, a circuit board 40 that mounts electrical components electrically coupled with the OSAs, 20a and 20b, in a top surface 40a and a back surface 40b. The circuit board 40 has a pair of rectangular cuts 41 in the front edge 40c thereof to set the OSA 20 therein. Accordingly, the cut 41 may have a shape tracing an outer appearance of the housing 21 of the OSA 20. A deep end 41b of the cut 41 faces the rear wall 21c of the housing 21. In other words, the OSA 20 is placed within the cut 41 such that the rear wall 21c of the housing 21 faces against the deep end 41b of the rectangular cut 41. Each of the lead pins 22 is, as the housing 21 is set in the rectangular cut 41, soldered to a pad 42 on the back surface 40b of the circuit board 40.

The circuit board 40 provides a pair of board connectors 50 for respective OSAs 20. Specifically, the board connectors 50, which may be a male connector, are fitted within an additional cut 43 formed in the deep end 41b of the rectangular cut 41. The board connectors 50 are, as they are set within the other cut 43, soldered in the top surface 40a of the circuit board 40.

The optical transceiver 1 further installs relay connectors 60 with a cylindrical or co-axial shape, which may be a type of the female-female connector. One of ends 61 of the relay connector 60 may be fitted with the housing connector 23, while, the other end 62 may be fitted with the board connector 50. In other words, the housing connector 23 receives one end 61 of the relay connector 60, while, the board connector 50 receives the other end 62 of the relay connector 60. The relay connector 60 thus arranged may transmit high frequency signals without degrading them. These connectors, namely, the housing connector 23, the relay connector 60, and the board connector 50 are arranged along the reference line RL which is substantially parallel to an optical axis of the optical subassembly 20 but perpendicular to the front wall 21a and the rear wall 21c of the housing 21.

Figure 7A:
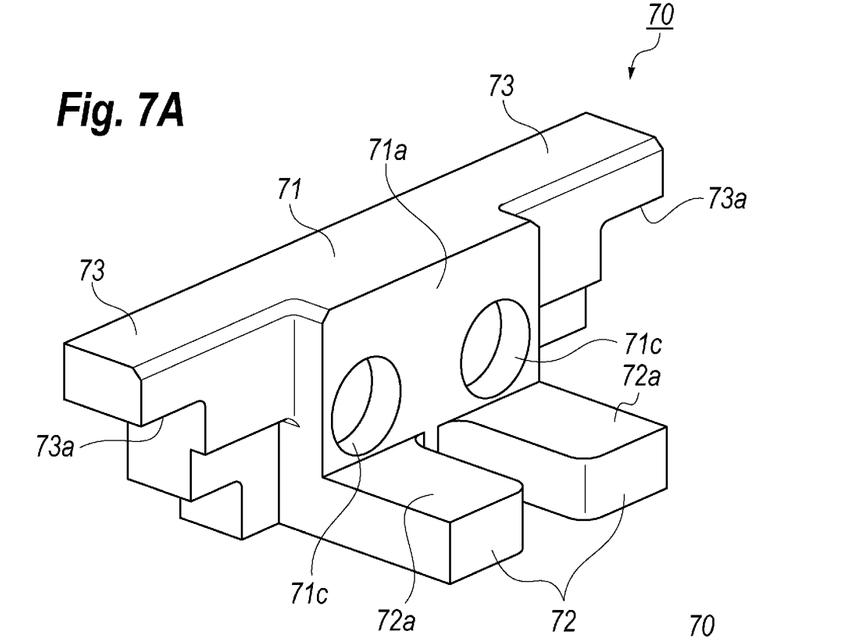
FIGS. 7A and 7B show an example of a holder to support the optical assembly.
Figure 7B:
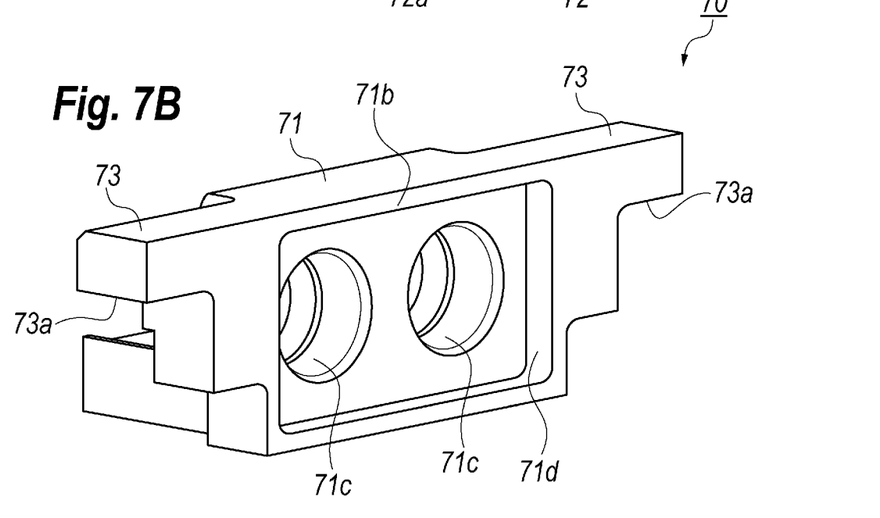

The optical transceiver 1 further includes a holder 70. FIG. 7A is a perspective drawing of the holder 70 viewed from one direction; while, FIG. 7B is also a perspective drawing of the holder 70 but it is viewed from another direction opposite to the former direction. The holder 70 includes a body 71, a pair of legs 72, and a pair of arms 73. The holder 70 may be made of insulating resin.

The body 71 with substantially rectangular shape is put between the rear wall 21c of the housing 21 and the deep end 41b of the rectangular cut 41 of the circuit board 40. The body 71 provides a rear surface 71a extending substantially in parallel to the deep end 41b of the rectangular cut 41, and a front surface 71b extending substantially in parallel to the rear wall 21c of the housing 21. The body 71 provides a pair of apertures 71c. Specifically, the front surface 71b provides a rectangular hollow 71d, and the apertures 71c are dug from the bottom of this hollow 71d. The apertures 71c, which have a circular shape tracing the outer shape of the housing connector 23 and the relay connector 60, extend from the bottom of the hollow 71d to the rear surface 71a.

Inserted into the apertures 71c is the housing connector 23 and the relay connector 60. That is, the apertures 71c receive the housing connector 23 and the relay connector 61, an end of which is inserted into the housing connector 23. Then, the housing connector 23 and the relay connector 61 are secured by the holder 70 as being aligned therewith.

Two legs 72, which are a rectangular bar, or rectangular block, each extends from a portion beneath the aperture 71c. Specifically, the legs 72 extend from the bottom of the body 71 to a portion above the top surface 40a of the circuit board 40 along the reference line RL. The leg 72 has a surface 72a extending substantially in parallel to the top surface 40a and the back surface 40b of the circuit board 40.

The surface 72a supports the board connector 50; specifically, the board connector 50 is rid on the surface 72a as receiving the other end of the relay connector 62. In other words, the surface 72a extends from the body 71 to a space above the board connector 50 to support the board connector 50 and the relay connector 60 thereon as being aligned with the board connector 50.

The arms 73 extend from respective sides of the body 71 to a space below the back surface 40b of the circuit board 40 along a direction intersecting the reference line RL. The arms 73 have a surface 73a extending substantially in parallel to the top surface 40a and the back surface 40b of the circuit board 40.

This surface 73a supports the back surface 40b of the circuit board 40, that is, the legs 72 and the arms 73 put the circuit board 40 therebetween to restrain the circuit board 40 from clattering. Because the holder 70 holds the housing connector 23, the OSA 20 providing the housing connector 23 may be stable even when a stress is applied in the thickness direction of the circuit board 40. Thus, the circuit board 40 may be installed within the housing 10 as being put between the legs 72 and arms 73 of the holder 70.

Figure 8A:
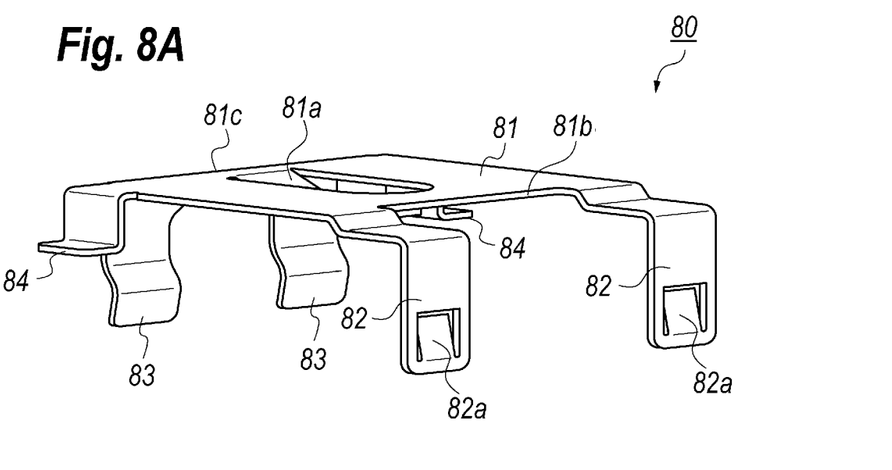
FIG. 8A is a perspective view of an example of a support.
Figure 8B:
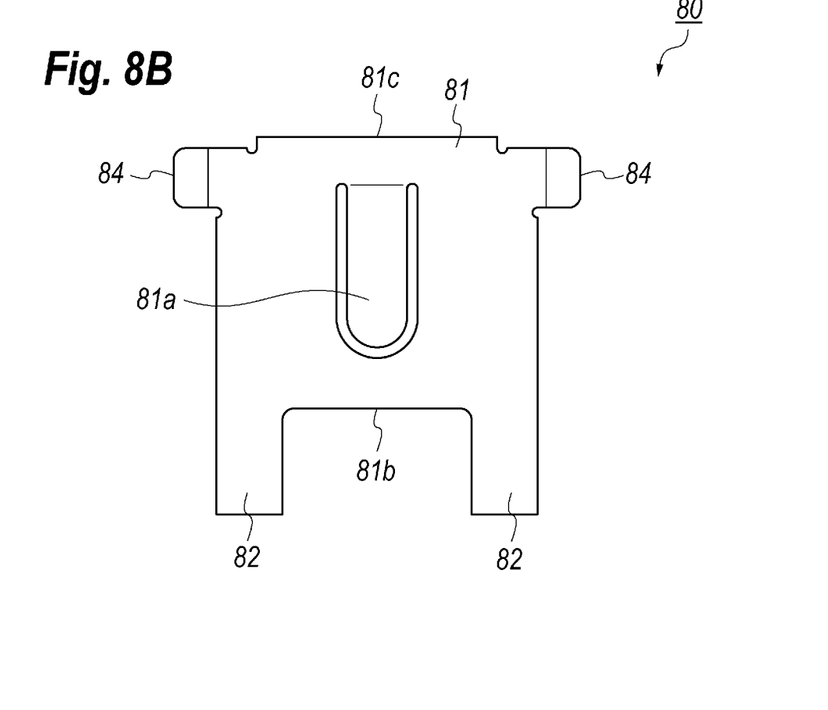
FIG. 8B is a plan view of the support.
Figure 9:
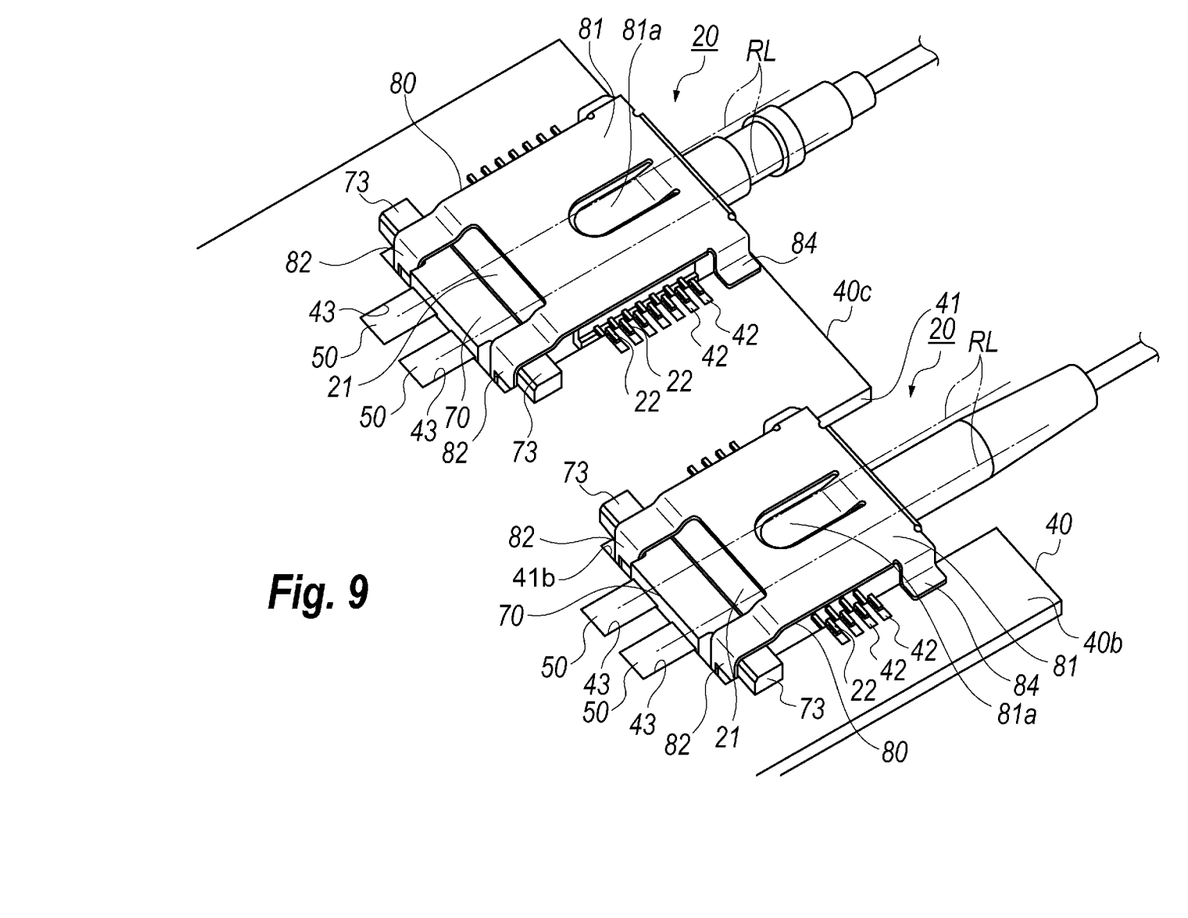
FIG. 9 also magnifies the optical assembly shown in FIG. 2.
Figure 10:
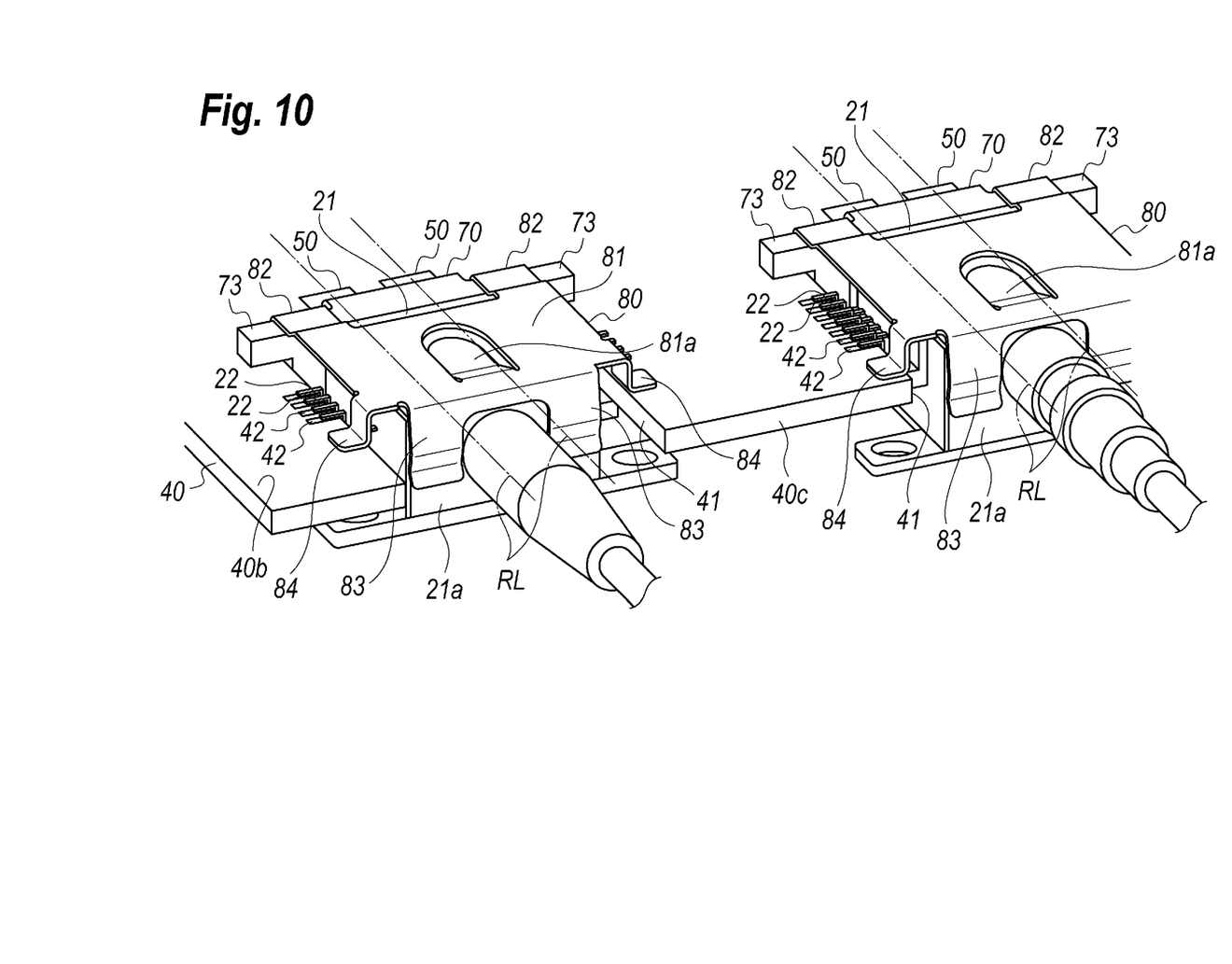
FIG. 10 shows a mechanism to support the optical assembly by the holder and the support.

The optical transceiver 1 may further provide a latch 80. FIG. 8A is a perspective view of the latch 80; while, FIG. 8B is a plan view thereof. FIGS. 9 and 10 magnify a portion of the optical transceiver 1 shown in FIG. 2, where the OSAs 20 are placed in the rectangular cut 41 of the circuit board 40 and fixed thereto by the latch 80. The latch 80 includes a primary plane 81, a pair of legs 82, another pair of legs 83, and a pair of arms 84. The latch 80 may be made of metal sheet only by cutting and bending without sticking or welding.

The primary plane 81 with a rectangular shape is arranged under the bottom 21d of the housing 21. The primary plane 81 provides a first tab 81a in a center thereof. The first tab 81a is formed by cutting the primary plane 81 in a U-shape and bending an area surrounded by the U-shaped cut to show an elastic function. The first tab 81a is in contact with and presses the bottom 21d of the housing 21. That is, the first tab presses the housing 21 of the OSA 20 along the thickness direction of the circuit board 40.

The first legs 82 with an L-shaped cross section extend from an edge 81b of the primary plane 81 and are bent downward in an intermediate portion thereof. The portion bent downward of the first leg 82, which extends along the rear wall 21c of the housing 21, provides a tab 82a abutting against the rear wall 21c of the housing 21. The tab 82a, which may be formed by cutting the bent portion in a U-shape and bending the inner portion of the U-shaped cut to form a leaf spring.

The second legs 83, which extend from the other edge 81c of the primary plane 81, are bent downward to run along the front surface 21a of the housing 21. The second leg 83 in a portion bent downward has an S-shaped cross section to show an elastic function. The second leg 83 in the portion bent downward may abut against the front wall 21a of the housing 21 to press the wall 21a rearward along the reference line RL. Thus, the first and second legs, 82 and 83 put and secure the housing 21 of the OSA 20 therebetween.

The arms 84, which extend from respective sides close to the front edge 81c of the primary plane 81 and bent twice to form an L-shaped cross section. The tip portion of the arm 84 comes in contact with the back surface 40b of the circuit board 40 to be soldered thereat.

Thus, the optical transceiver 1 provides the holder 70 to secure the housing connector 23 and the relay connector as being aligned to each other, and to secure the board connector 50 and the relay connector 60 as being aligned to each other. Accordingly, mechanical stress caused in a boundary between the housing connector 23 and the relay connector 60, and/or between the board connector 50 and the relay connector 60, may be suppressed or eliminated, which may enhance the reliability of the optical module 10 against the mechanical stress.

The holder 70 supports the circuit board 40 by the leg 72 thereof that extends in the space above the back surface 40b of the circuit board 40. Accordingly, even when a stress is applied to the OSA 20 along the thickness direction of the circuit board 40, the OSA may be escaped from sliding along such direction and mechanical stresses caused in the connection between the lead pins of the OSA 20 and the pads 42 of the circuit board 40 may be suppressed.

The latch 80 in the first tab 81a thereof may push the housing 21 of the OSA 20 along the thickness direction of the circuit board 40 but the holder 70 in the leg 72 thereof may support the circuit 40 board thereon; while, the second leg 83 thereof may push the OSA 20 rearward, namely, to the direction toward the circuit board 40, and the tab 82a in the first leg 82 pushes the rear wall 21c frontward, which may prevent the OSA 20 from extracting from the rectangular cut 41 of the circuit board 40. Thus, even when stresses applied to the OSA 20 along various directions, the housing 21 of the OSA 20 may be securely fixed with the circuit board 40, and the connections between the lead pins 22 and the pads 42 on the circuit board 40, and/or between the board connector 50 and the circuit board 40 may be escaped from breakage.

The housing 21 provides a base F with screw holes H, but the OSA 20 of the present embodiment is not assembled on the circuit board 40 by screws. The OSA is assembled with the circuit board 40 by inserting the housing connector 23 into the aperture 71c of the holder 70.

While several embodiments and variations of the present invention are described in detail herein, it should be apparent that the disclosure and teachings of the present invention will suggest many alternative designs to those skilled in the art. For instance, an embodiment described above has the holder 70 whose arms extend in a direction perpendicular to the direction along the reference line RL. However, the arm 73 may only extend above the back surface 40b of the circuit board to put the circuit board 40 with the legs 71. Accordingly, such changes and modifications are to be understood as included within the scope of the present invention as defined by the appended claims, unless they depart therefrom.

What is claimed is:

1. An optical transceiver, comprising:
   an optical subassembly having a function at least one of converting an electrical signal into an optical signal and an optical signal into an electrical signal;
   a circuit board electrically coupled with the optical subassembly via an RF connector, the circuit board having a rectangular cut to set the optical subassembly therein; and
   a holder having a leg and an arm for putting the circuit board therebetween,
   wherein the holder supports the RF connector thereon.

2. The optical transceiver of claim 1,
   wherein the RF connector has a cylindrical shape and the holder has an aperture to receive the RF connector therein.

3. The optical transceiver of claim 1,
   wherein the RF connector includes a housing connector involved in the optical subassembly, a board connector soldered to the circuit board, and a relay connector to couple the housing connector with the board connector.

4. The optical transceiver of claim 3,
   wherein the housing connector and the board connector have a type of a male connector, while, the relay connector has a type of a female-female connector.

5. The optical transceiver of claim 3,
   wherein the holder provides a leg and an arm, the leg supporting the board connector that is connected to a top surface of the circuit board, and the arm coming in contact with a back surface of the circuit board opposite to the top surface thereof to put the circuit board therebetween.

6. The optical transceiver of claim 3,
   wherein the circuit board further provides another cut in a deep end of the rectangular cut, the other cut setting the board connector therein.

7. The optical transceiver of claim 1,
   further including a latch made of metal sheet, the latch setting the optical subassembly in the rectangular cut of the circuit board.

8. The optical transceiver of claim 7,
   wherein the latch provides a primary plane with a tab in a center thereof, the tab pushing the optical subassembly against the circuit board.

9. The optical transceiver of claim 7,
   wherein the latch provides a first leg and a second leg for putting the optical subassembly therebetween along an optical axis of the optical subassembly.

10. The optical transceiver of claim 7,
    wherein the latch provides an arm fixed to the circuit board.

11. The optical transceiver of claim 1,
    further including an optical receptacle to receive an external optical fiber to be optically coupled with the optical subassembly, the optical receptacle being connected with the optical subassembly with an inner fiber.

12. The optical transceiver of claim 11,
    wherein the optical subassembly is installed within the optical transceiver only via the circuit board.

13. The optical transceiver of claim 12,
    wherein the optical subassembly has a base not screwed to a case of the optical transceiver.

* * * * *